A. P. STEPHENS.
Broaching-Machines.

No. 141,091. Patented July 22, 1873.

Witnesses
Chas H Smith
Geo. D. Walker

Inventor
Anson P. Stephens
Lemuel W. Serrell
atty.

UNITED STATES PATENT OFFICE.

ANSON P. STEPHENS, OF BROOKLYN, ASSIGNOR TO THE STEPHENS PATENT VISE COMPANY, OF NEW YORK, N. Y.

IMPROVEMENT IN BROACHING-MACHINES.

Specification forming part of Letters Patent No. 141,091, dated July 22, 1873; application filed January 24, 1873.

*To all whom it may concern:*

Be it known that I, ANSON P. STEPHENS, of Brooklyn, in the county of Kings and State of New York, have invented an Improvement in Broaching-Machines, of which the following is a specification:

Broaching-machines have been made for dressing out the interior surface of square, polygonal, and other-shaped holes, the broach being a hardened-steel tool, tapered and grooved transversely, so as to form surfaces composed of cutting edges or chisels. This tool, being driven endwise through the article to be dressed, cleans and planes out the hole previously cast or formed therein, so as to make the same entirely true, parallel, and finished.

In forcing the broach endwise through the article considerable power is necessarily expended; and, as the hole to be trued is usually more or less irregular, the broach is liable to be broken if the article operated upon is clamped firmly; and, if said article is free to accommodate itself to the broach, such broach is liable to injury in consequence of the article trembling or seeking to change its position if the sustaining-bearing supports the article more on one side of the center of the broach than on the other.

My invention consists in a self-accommodating bearing for the article being broached, whereby the said article is free to assume the proper position in relation to the broach, and a firm bearing or support is given to such article on all sides of the broach while being operated upon, so that there will not be the tremulous motion or risk of injury to the tool heretofore usual.

Figure 1:
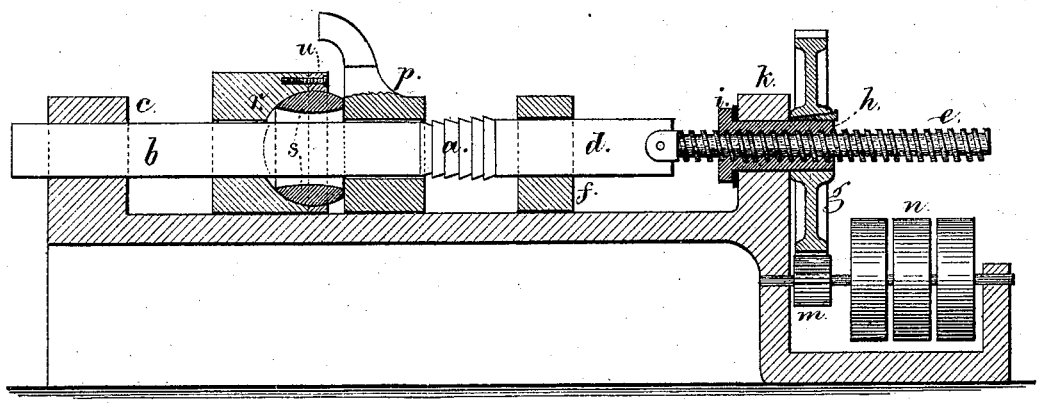
Figure 2:
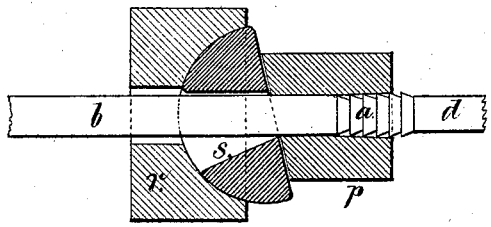

In the drawing, Figure 1 is a vertical section of the broaching-machine, and Fig. 2 is a sectional plan of the self-adjusting bearing.

The broaching-tool $a$ is of the desired shape and character. It is guided, at one end, by the bar $b$, sliding in the support $c$, or otherwise; at the actuating end by the bar $d$, that is connected with the screw $e$, and slides in the support $f$. The gear-wheel $g$ is connected with the screw-nut $h$, so that, by revolving the wheel $g$, the screw $e$ will be moved along in either one direction or the other.

In broaching-machines the frame has usually been made as a bow, passing around the wheel $g$, so as to give a central bearing of the nut against such frame. This makes the machine expensive and heavy. To avoid this I make the nut $h$ with a forward flange, $i$, bearing against washers and the surface of the head or pillar block $k$; and the wheel $g$ is simply keyed or secured around the nut behind the pillar-block, and has nothing of back pressure from the screw, but simply revolves the same.

The nut $h$ and wheel $g$ are revolved by the pinion $m$ and pulley $n$.

At $p$ the article to be broached is represented, the same being part of a vise-stock.

The abutment $r$ is made with a self-adjusting bearing, $s$, against which the article $p$ is pressed by the action of the broach, and which bearing moves sufficiently to support the article on all sides of the broach and accommodate itself to any inequalities in the surface of such article. The bearing $s$ sets into either a hemispherical or cylindrical recess in the abutment $r$. Thereby the surface of the bearing $s$ may assume more or less of an angular position to the broach, according to the surface of the article operated upon.

The cap $u$ may be employed to retain the globular bearing $s$.

I claim as my invention—

1. The self-adjusting bearing $s$ within the abutment $r$, in combination with the broaching-tool $a$ and its actuating mechanism, substantially as set forth.

2. The nut $h$ and its flange $i$, bearing against the pillar-block $k$ and actuated by the wheel $g$, in combination with the screw $e$, broaching-tool $a$, and supporting-bars, substantially as set forth.

Signed by me this 18th day of January, 1873.

ANSON P. STEPHENS.

Witnesses:
GEO. T. PINCKNEY,
CHAS. H. SMITH.